United States Patent
Bregman et al.

(10) Patent No.: US 11,307,964 B2
(45) Date of Patent: Apr. 19, 2022

(54) MULTI-LEVEL DEBUGGER

(71) Applicant: Red Hat Israel, Ltd., Ra'anana (IL)

(72) Inventors: Arie Bregman, Ra'anana (IL); David Sariel, Ra'anana (IL)

(73) Assignee: Red Hat Israel, Ltd., Ra'anana (IL)

( * ) Notice: Subject to any disclaimer, the term of this patent is extended or adjusted under 35 U.S.C. 154(b) by 0 days.

(21) Appl. No.: 16/200,530

(22) Filed: Nov. 26, 2018

(65) Prior Publication Data

US 2020/0167264 A1  May 28, 2020

(51) Int. Cl.
*G06F 11/36* (2006.01)
*G06F 8/41* (2018.01)

(52) U.S. Cl.
CPC ............ *G06F 11/3636* (2013.01); *G06F 8/42* (2013.01); *G06F 11/3648* (2013.01)

(58) Field of Classification Search
CPC .... G06F 11/3636; G06F 8/42; G06F 11/3648; G06F 8/31; G06F 2201/81
See application file for complete search history.

(56) References Cited

U.S. PATENT DOCUMENTS

| | | | | |
|---|---|---|---|---|
| 6,826,713 B1 * | 11/2004 | Beesley | .............. | G06F 11/3636 713/2 |
| 7,107,578 B1 * | 9/2006 | Alpern | ................ | G06F 11/3636 714/E11.207 |
| 7,299,454 B2 * | 11/2007 | Pugh | .................. | G06F 11/3664 714/E11.207 |
| 8,196,109 B2 * | 6/2012 | Fung | ................... | G06F 11/3664 717/125 |
| 8,484,619 B2 * | 7/2013 | Shah | ...................... | G06F 11/362 717/125 |
| 9,122,794 B2 * | 9/2015 | Smiljanic | ............ | G06F 11/3624 |
| 9,575,869 B2 * | 2/2017 | Pechanec | ............ | G06F 11/3636 |
| 9,659,012 B2 * | 5/2017 | Thatte | ..................... | G06F 16/00 |
| 9,836,386 B2 * | 12/2017 | Vecera | ................ | G06F 11/3664 |
| 10,169,201 B2 * | 1/2019 | Cook | .................... | G06F 9/4843 |
| 10,185,644 B2 * | 1/2019 | Pechanec | ............ | G06F 11/3624 |
| 2001/0005852 A1 * | 6/2001 | Bogle | ................. | G06F 9/45512 718/102 |
| 2011/0119654 A1 * | 5/2011 | Miller | ................. | G06F 11/3664 717/125 |

(Continued)

OTHER PUBLICATIONS

Earlam, D., et al., "CDT/MultiCoreDebugWorkingGroup/PotentialFeatures—Eclipsepedia," Eclipse Foundation, Inc., Nov. 1, 2013, 14 Pages. https://wiki.eclipse.org/CDT/MultiCoreDebugWorkingGroup/PotentialFeatures.

(Continued)

*Primary Examiner* — Matthew J Brophy
(74) *Attorney, Agent, or Firm* — Womble Bond Dickinson (US) LLP (57) ABSTRACT

A task may be executed using a domain specific language (DSL) debugger, the task including one or more modules. A module debugger associated with a module of the one or more modules of the task may be identified. Task debugging data associated with the execution of the task using the DSL debugger may be transmitted to the identified module debugger. Module debugging data may be received from the identified module debugger. Multi-level debugging data including the task debugging data and the received module debugging data may be generated.

17 Claims, 7 Drawing Sheets

(56) References Cited

U.S. PATENT DOCUMENTS

| | | | | |
|---|---|---|---|---|
| 2011/0289482 | A1* | 11/2011 | Bentley | G06F 11/3664 717/125 |
| 2012/0005531 | A1* | 1/2012 | Manuzak | G06F 11/366 714/25 |
| 2014/0123116 | A1* | 5/2014 | Smiljanic | G06F 11/3664 717/130 |
| 2014/0344625 | A1* | 11/2014 | Thatte | G06F 11/3636 714/38.1 |
| 2015/0033210 | A1* | 1/2015 | Deckert | G06F 11/3636 717/129 |
| 2016/0062870 | A1* | 3/2016 | Menahem | G06F 11/3664 717/125 |
| 2016/0179655 | A1* | 6/2016 | Vecera | G06F 9/45558 717/134 |
| 2016/0246700 | A1* | 8/2016 | Pechanec | G06F 11/3636 |
| 2018/0196730 | A1* | 7/2018 | Cook | G06F 16/24568 |
| 2018/0373620 | A1* | 12/2018 | Thomson | G06F 11/3664 |

OTHER PUBLICATIONS

Florisson, M., "Multi-Level Debugging for Cython," Semantic Scholar, 2011, 8 Pages.
Pavletic, D., et al., "Multi-Level Debugging for Extensible Languages," itemis AG, 2015, 2 Pages.
Vogel, L., "Java Debugging with Eclipse—Tutorial," Vogella GmbH, 2009, 10 Pages.
VranýJ., et al., "Multilanguage Debugger Architecture," SOFSEM 2010: Theory and Practice of Computer Science, LNCS, vol. 5901, pp. 731-742.

* cited by examiner

MULTI-LEVEL DEBUGGER

TECHNICAL FIELD

Aspects of the present disclosure relate to domain specific languages (DSLs), and more particularly, to multi-level debugging of DSL tasks.

BACKGROUND

A domain-specific language (DSL) is a computer language that is specialized to a particular application domain. A developer can develop applications to perform various tasks, such as "copy", "file", "command" and "ping," without having knowledge of the underlying programming code required to perform these tasks. Each task can include calls to one or more modules that are used to perform the task. The one or more modules can include script to perform an operation required by the task.

BRIEF DESCRIPTION OF THE DRAWINGS

The described embodiments and the advantages thereof may best be understood by reference to the following description taken in conjunction with the accompanying drawings. These drawings in no way limit any changes in form and detail that may be made to the described embodiments by one skilled in the art without departing from the spirit and scope of the described embodiments.

DETAILED DESCRIPTION

A domain-specific language (DSL) is a computer language that is specialized to a particular application domain. A developer can develop applications to perform various tasks, such as "copy", "file", "command" and "ping," by using basic commands written in the DSL language without having knowledge of the underlying programming code required to perform these tasks. The commands written in the DSL language for a task can include calls to one or more modules that are used to perform the task. The one or more modules can include script to perform an operation required by the task. One or more tasks may be arranged in a data structure, such as an abstract syntax tree, where each task is represented by a node in the abstract syntax tree. The abstract syntax tree may be a tree representation of the abstract syntactic structure of the commands written in the DSL language.

In embodiments, the one or more modules of the task may include script in various programming languages. For example, the one or more modules of the task may include script in JAVA, JavaScript, Perl, Python, etc. The modules used by the DSL task may be located in libraries that are stored at remote servers based on the programming language of the module. For example, modules using the JAVA programming language may be located in a library on a JAVA server, while modules using the Python programming language may be located in a library on a Python server.

During the development of an application using a DSL, a developed may wish to identify and address performance issues (e.g., errors, incorrect outputs, etc.) of one or more tasks of the application. To identify such issues, a developer may execute the one or more tasks of the application using a DSL debugger. The DSL debugger may execute the commands of the task that are written in the DSL language and generate DSL debugging information that may be used to identify performance issues with the task.

However, as previously described, the modules of the task may be written in a programming language that is different than the DSL language. Furthermore, the modules of the task may be located in a library of a remote server based on the programming language of the module. Since the modules of a task are written in a programming language that is different than the DSL language, the DSL debugger is unable to debug the modules of the task. Accordingly, to debug a module of a task, a developer is required to pause the execution of the task using the DSL debugger, locate a module debugger for the module on a remote server, identify input values for the module from the task, enter the input values for the module, execute the module using the module debugger, receive the output values of executing the module using the module debugger, entering the output values into the task and resuming execution of the task using the DSL debugger. This process may be repeated for each module of the task, resulting in a process that is tedious, time consuming and an inefficient use of computing resources of a computing system. Furthermore, by requiring a developer to manually enter input/output values for each module, there is a potential for incorrect values to be entered for a module. The entering of incorrect values into a module may result in additional debugging operations being performed on the module using the correct values, which uses additional computing resources of the computing system.

Aspects of the present disclosure address the above-noted and other deficiencies by using a processing logic to perform a multi-level debugging operation on a task using a DSL language. In embodiments, a task may be executed using a DSL debugger. The task may include one or more modules. Each module may include script in a programming language to perform operations associated with the task. During execution of the task, the processing logic may identify a breakpoint in the task. The breakpoint may serve as an indicator to the processing logic to pause the execution of the task. In embodiments, the breakpoint may correspond to a location of the call to the module in the DSL command.

Upon pausing the execution of the task, the processing logic may identify a module debugger that is associated with the module of the task. In embodiments, the module debugger may be identified based on the programming language of the module. For example, if a module uses Python programming language, the processing logic may identify a Python debugger that is associated with the module. Once a module debugger has been identified, the processing logic may transmit task debugging data to the module debugger. The task debugging data can include input values for the module that are to be used by the module debugger when executing the module.

The processing logic may receive module debugging data that is generated by the module debugger when executing the module. The module debugging data may include output values from executing the module that are to be used by the task. Upon receiving the module debugging data, the processing logic may generate multi-level debugging data that includes the task debugging data generated by executing the task using the DSL debugger and the module debugging data generated by the module debugger. In some embodiments, upon generating the multi-level debugging data, the processing logic may resume executing the task using the DSL debugger. In embodiments, the processing logic may not resume executing the task using the DSL debugger until an input is received.

Accordingly, by identifying a module debugger associated with a module of a task, providing task debugging information to the module debugger and receiving module debugging information, the efficiency and ease of debugging tasks using a DSL is greatly improved. By no longer requiring a developer to identify the appropriate module debugger and manually enter the input/output values of the module debugger, less computing resources may be dedicated to performing debugging operations and the results may be more reliable, improving the performance of the computing system.

Figure 1:
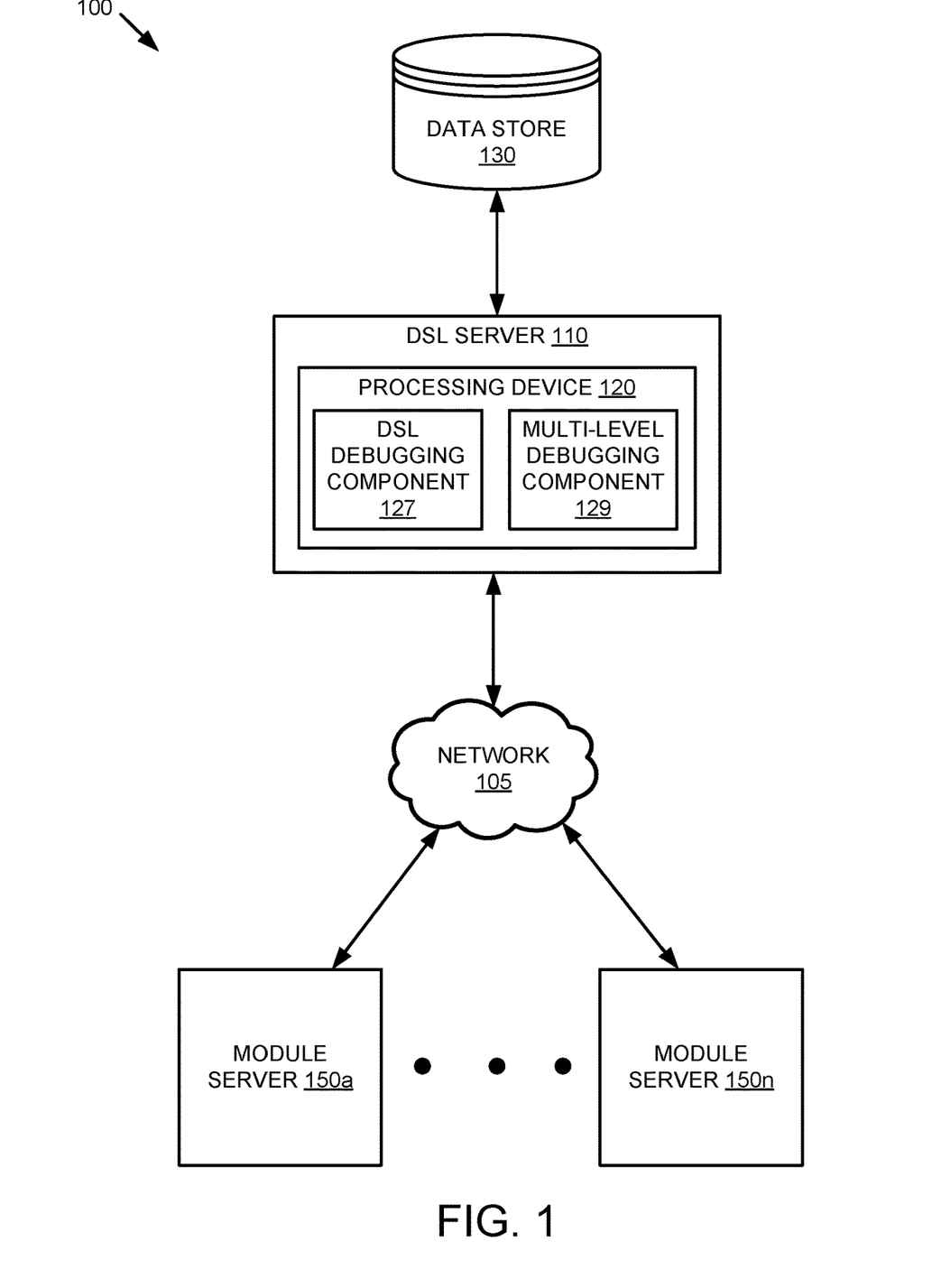
FIG. 1 is a block diagram that illustrates an example multi-level debugging system, in accordance with some embodiments of the present disclosure.

FIG. 1 is a block diagram that illustrates an example multi-level debugging system 100, in accordance with some embodiments of the present disclosure. The multi-level debugging system may include DSL server 110 and module servers 150*a-n*. In one embodiment, the DSL server 110 may host a configuration management system. In embodiments, module servers 150*a-n* may host one or more modules that are utilized by a configuration management system of DSL server 110. In some embodiments, each of module servers 150*a-n* may host one or more modules of a particular programming language. For example, module server 150*a* may host one or more modules that utilize the Python programming language, while module server 150*n* may host one or more modules that utilize the JAVA programming language. Module servers 150*a-n* may further include module debuggers for debugging modules.

As illustrated in FIG. 1, multi-level debugging system 100 includes a DSL server 110 includes a computing processing device 120 and a data store 130. The DSL server 110 and module servers 150*a-n* are coupled to each other (e.g., may be operatively coupled, communicatively coupled, may communicate data/messages with each other) via network 105. Network 105 may be a public network (e.g., the internet), a private network (e.g., a local area network (LAN) or wide area network (WAN)), or a combination thereof. In one embodiment, network 105 may include a wired or a wireless infrastructure, which may be provided by one or more wireless communications systems, such as a wireless fidelity (WiFi) hotspot connected with the network 105 and/or a wireless carrier system that can be implemented using various data processing equipment, communication towers (e.g. cell towers), etc. The network 105 may carry communications (e.g., data, message, packets, frames, etc.) between the various components of server 100. The data store 130 may be a persistent storage that is capable of storing data. A persistent storage may be a local storage unit or a remote storage unit. Persistent storage may be a magnetic storage unit, optical storage unit, solid state storage unit, electronic storage units (main memory), or similar storage unit. Persistent storage may also be a monolithic/single device or a distributed set of devices.

Each component may include hardware such as processing devices (e.g., processors, central processing units (CPUs), memory (e.g., random access memory (RAM), storage devices (e.g., hard-disk drive (HDD), solid-state drive (SSD), etc.), and other hardware devices (e.g., sound card, video card, etc.). The servers 110, 150*a-n* may comprise any suitable type of computing device or machine that has a programmable processor including, for example, server computers, desktop computers, laptop computers, tablet computers, smartphones, set-top boxes, etc. In some examples, DSL server 110 and module servers 150*a-n* may comprise a single machine or may include multiple interconnected machines (e.g., multiple servers configured in a cluster). DSL server 110 and module servers 150*a-n* may be implemented by a common entity/organization or may be implemented by different entities/organizations. For example, DSL server 110 may be operated by a first company/corporation and DSL server 110 and module servers 150*a-n* may be operated by a second company/corporation. Each server may execute or include an operating system (OS), as discussed in more detail below. The OS of a server may manage the execution of other components (e.g., software, applications, etc.) and/or may manage access to the hardware (e.g., processors, memory, storage devices etc.) of the computing device.

In embodiments, processing device 120 may execute a DSL debugging component 127 and a multi-level debugging component 129. The DSL debugging component may perform debugging operations on one or more tasks utilizing a DSL. The multi-level debugging component 129 may identify one or more modules utilized by the task. The multi-level debugging component 129 may further identify one or more module servers for the one or more modules of the task in view of the one or more programming languages of the one or more modules of the task. Further details regarding multi-level debugging component 129 will be discussed at FIGS. 2-7 below.

Figure 2:
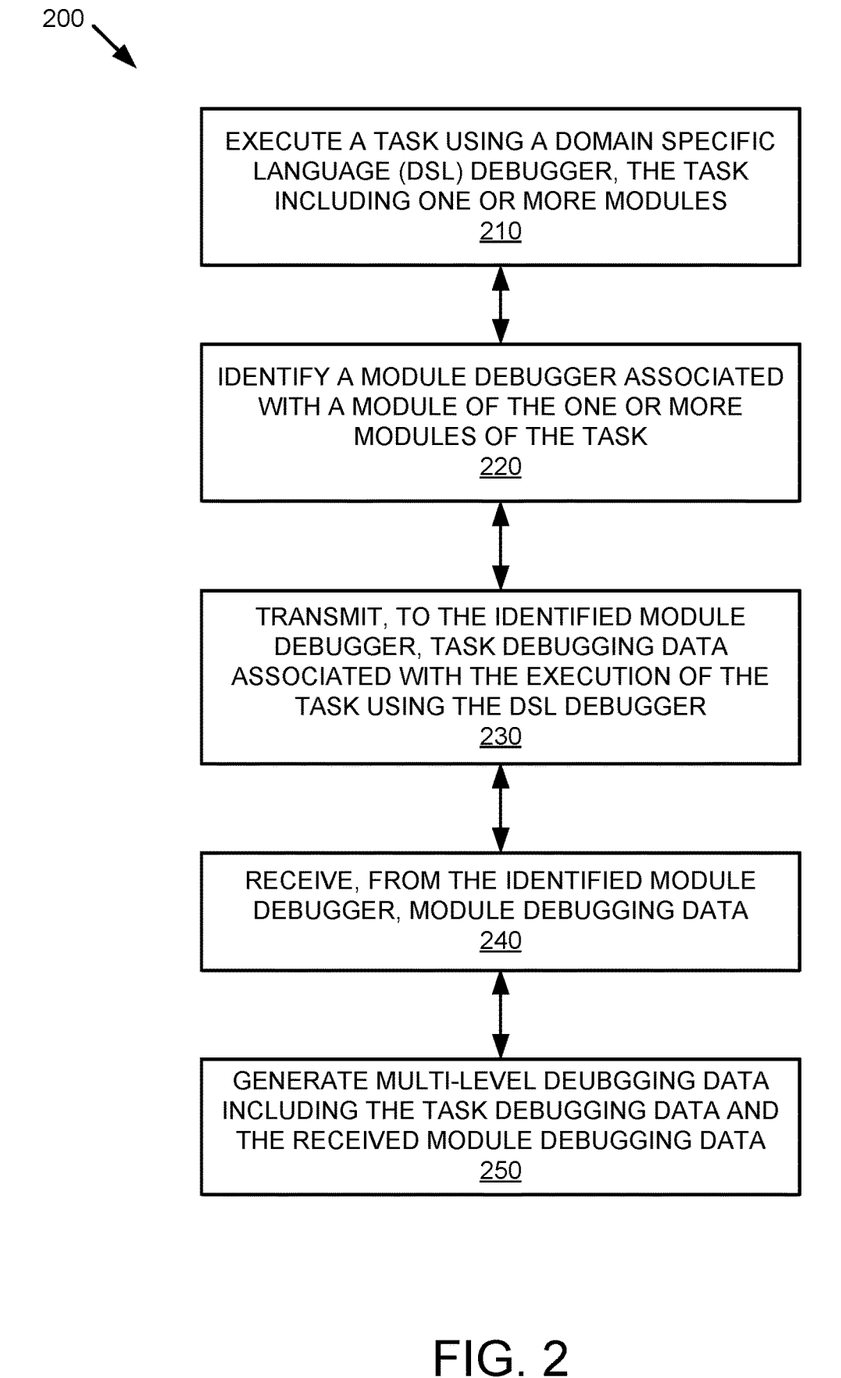
FIG. 2 is a flow diagram of a method of generating multi-level debugging data, in accordance with some embodiments of the present disclosure.

FIG. 2 is a flow diagram 200 of a method of generating multi-level debugging data, in accordance with some embodiments of the present disclosure. The method 200 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 200 may be performed by multi-level debugging component 129 of FIG. 1.

Referring to FIG. 2, at block 210 the processing logic executes a task using a DSL debugger (e.g., DSL debugging component 127 of FIG. 1). The task may include calls to one or more modules, where each of the modules may have a corresponding programming language. In embodiments, the task may correspond to a node of an abstract syntax tree. In some embodiments, the DSL debugger may utilize parameters associated with an occurrence of a triggering event to replicate the triggering event, as will be discussed in further detail below. While executing the task, the processing logic may identify a breakpoint in the script of the task. The breakpoint may serve as an indicator to the processing logic to pause the execution of the task. In embodiments, the breakpoint may correspond to a location of a call to a module within the script of the task.

At block 220, the processing logic identifies a module debugger associated with a module of the task. In embodiments, the processing logic may identify the module debugger in response to identifying a breakpoint in the script of the task. In some embodiments, the processing logic may identify the module debugger in view of the programming language of the module of the task. For example, if the module uses Python programming language, then the processing logic may identify a Python debugger for the module.

At block 230, the processing logic transmits task debugging data associated with the execution of the task using the DSL debugger to the identified module debugger. In embodiments, the task debugging data may include a location of the module, the programming language of the module and input values for the module. For example, the task debugging data may include a location, such as a file path, for the module within a library on the module server. The task debugging data may further include that the programming language of the module is Python as well as input values, such as a name or state of the task.

At block 240, the processing logic receives module debugging data from the identified module debugger. For example, the processing logic may receive a name and path of the module from the identified module or a line number corresponding a location in the task that the debugger is currently executing the script. At block 250, the processing logic generates multi-level debugging data that includes the task debugging data generated by the DSL debugger and the module debugging data received from the module debugger. In embodiments, the multi-level debugging data may be depending on the task and/or modules being used. For example, if the task creates a directory, the multi-level debugging data may include arguments (e.g., names, paths, etc.) used to create the directory. In another example, if the task initiates a service, the multi-level debugging data may include the name of the service and desired status (e.g., running, stopped, etc.).

In some embodiments, upon generating the multi-level debugging data, the processing logic may resume executing the task using the DSL debugger. In embodiments, the processing logic may not resume executing the task using the DSL debugger until an input is received. For example, upon generating the multi-level debugging data, the processing logic may not resume executing the task to allow a developer to resolve issues with the task that are identified in view of the generated multi-level debugging data prior to resuming execution of the task. Once the developer has resolved the issues, the developer may manually resume execution of the task by providing an input to the processing logic.

Figure 3:
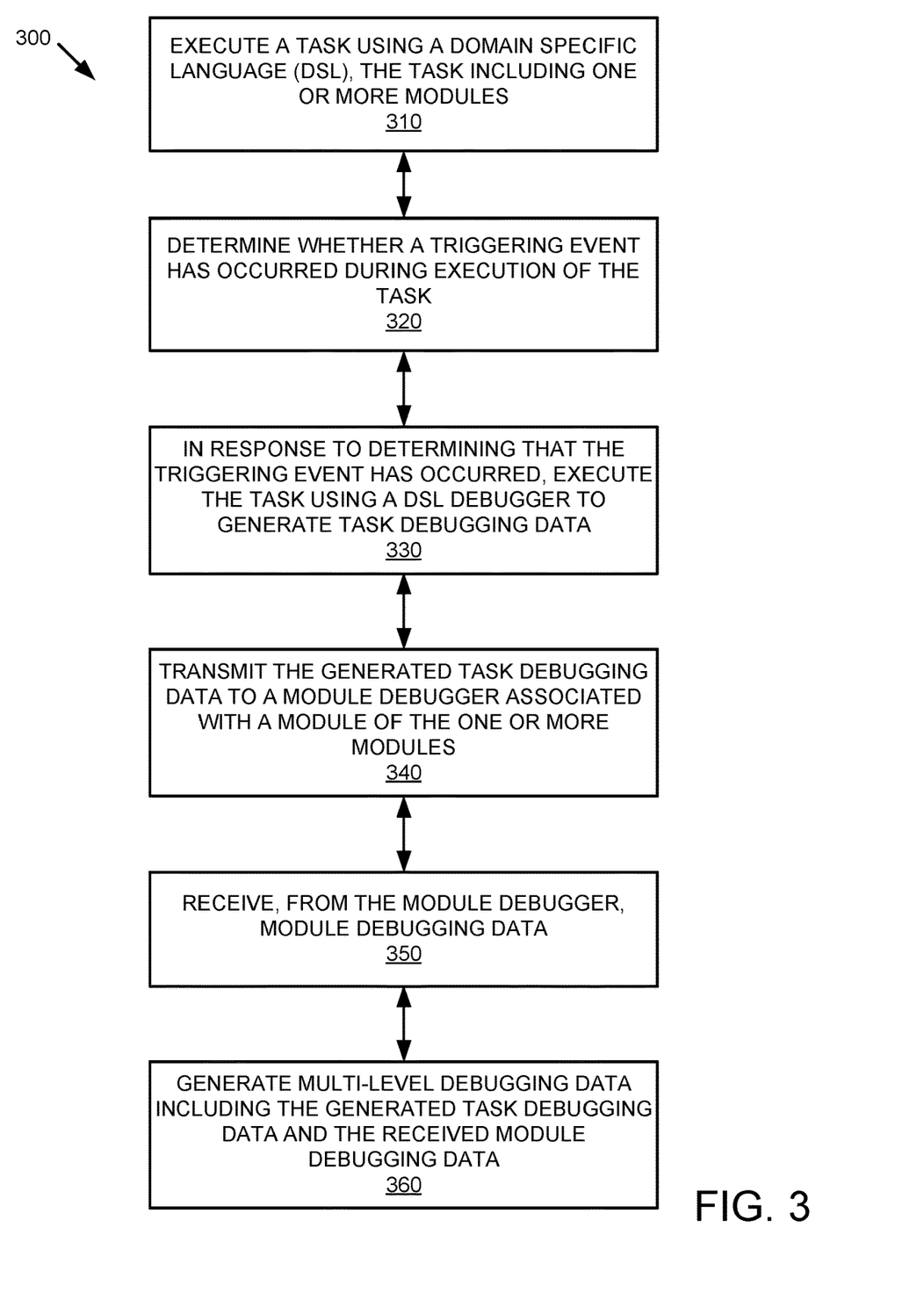
FIG. 3 is a flow diagram of a method of generating multi-level debugging data in response to a triggering event, in accordance with some embodiments of the present disclosure.

FIG. 3 is a flow diagram 300 of a method of generating multi-level debugging data in response to a triggering event, in accordance with some embodiments of the present disclosure. The method 300 may be performed by processing logic that comprises hardware (e.g., circuitry, dedicated logic, programmable logic, microcode, etc.), software (e.g., instructions run on a processing device to perform hardware simulation), or a combination thereof. In embodiments, aspects of method 300 may be performed by multi-level debugging component 129 of FIG. 1.

Referring to FIG. 3, at block 310 the processing logic executes a task that uses a domain specific language (DSL). At block 320, the processing logic determines whether a triggering event has occurred during execution of the task. In an embodiment, the triggering event may be an error that occurs during execution of the task. In embodiments, the triggering event may be receiving a request to debug the task. For example, a developed may manually initiate the debugging of the task by providing an input to the processing logic. In some embodiments, the triggering event may be a parameter associated with the task satisfying a threshold during execution of the task, as will be described in further detail below.

In embodiments, upon determining that the triggering event has occurred, the processing logic may insert a breakpoint into the script of the task. As previously described, the breakpoint may indicate that the processing logic is to pause the execution of the task. In embodiments, the breakpoint may be inserted at a location in the script of the task in view of the occurrence of the triggering event. For example, if a particular step or call to a module causes the occurrence of the triggering event, then the breakpoint may be inserted in the script at that particular step or call to the module.

At block 330, in response to determining that the triggering event has occurred during execution of the task, the processing logic executes the task using a DSL debugger to generate task debugging data. At block 340, the processing logic transmits the generated task debugging data to a module debugger associated with a module of the task. In embodiments, transmitting the generated task debugging data to the module debugger may include identifying a module debugger associated with the module in view of the programming language of the module, as previously described.

At block 350, the processing logic receives module debugging data from the module debugger. At block 360, the processing logic generates multi-level debugging data that includes the task debugging data generated by the DSL debugger and the module debugging data received from the module debugger.

Figure 4A:
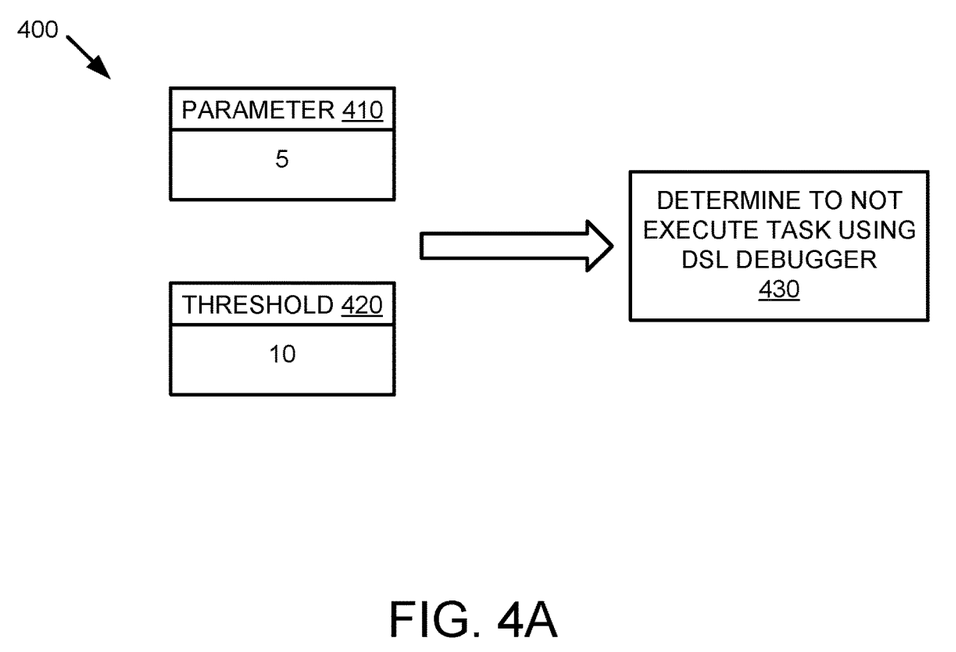
FIG. 4A is an illustration of an example of a multi-level debugging system determining to not execute a task using a DSL debugger in view of a triggering event in accordance with aspects of the present disclosure.

FIG. 4A is an illustration of an example of a multi-level debugging system 400 determining to not execute a task using a DSL debugger in view of a triggering event in accordance with aspects of the present disclosure. The multi-level debugging system 400 may include a parameter 410 that corresponds to an output value for a particular step of a task and/or a module of the task. The multi-level debugging system 400 may further include a threshold 420 that corresponds to a threshold value for parameter 410. If the value of the parameter 410 satisfies the threshold 420, then a triggering event has occurred and the task is executed using a DSL debugger. In the present example, parameter 410 is considered to have satisfied threshold 420 if the value of parameter 410 is greater than or equal to threshold 420. However, in some embodiments, a parameter may be considered to have satisfied the threshold if the value of the parameter is less than or equal to the threshold.

Referring to FIG. 4A, parameter 410 has a value of 5 and the threshold 420 has a value of 10. Since the value of parameter 410 does not satisfy threshold 420, at block 430 the multi-level debugging system 400 determines to not execute the task using a DSL debugger.

Figure 4B:
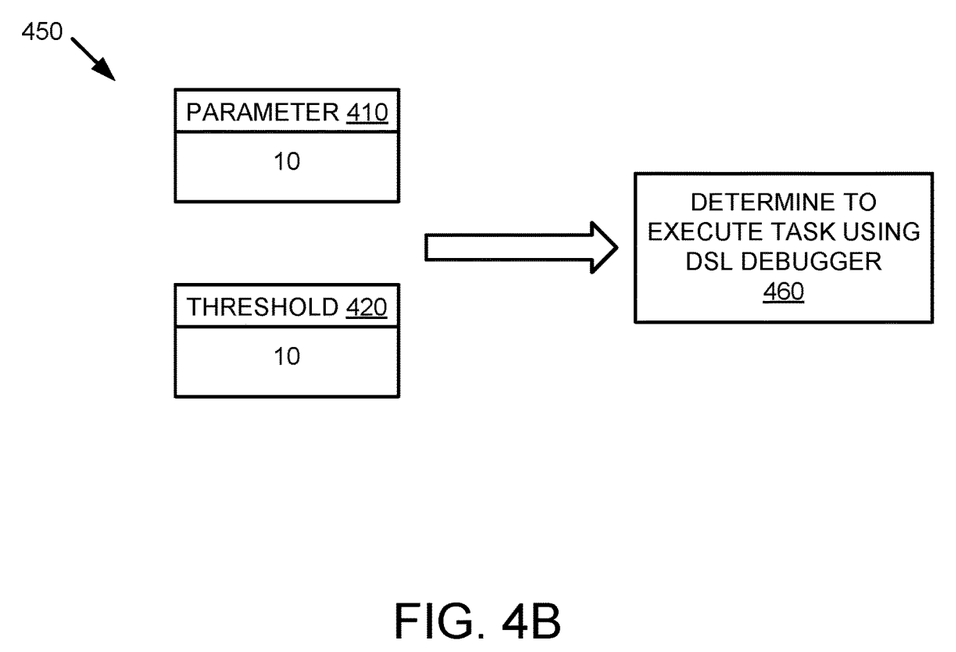
FIG. 4B is an illustration of an example of a multi-level debugging system determining to execute a task using a DSL debugger in response to the occurrence of a triggering event in accordance with aspects of the present disclosure.

FIG. 4B is an illustration of an example of a multi-level debugging system 450 determining to execute a task using a DSL debugger in response to the occurrence of a triggering event in accordance with aspects of the present disclosure. In FIG. 4B, parameter 410 has a value of 10 and the threshold has a value of 10. Since the value of parameter 410 satisfies threshold 420, at block 460 the multi-level debugging system 450 determines to execute the task using a DSL debugger.

Figure 5:
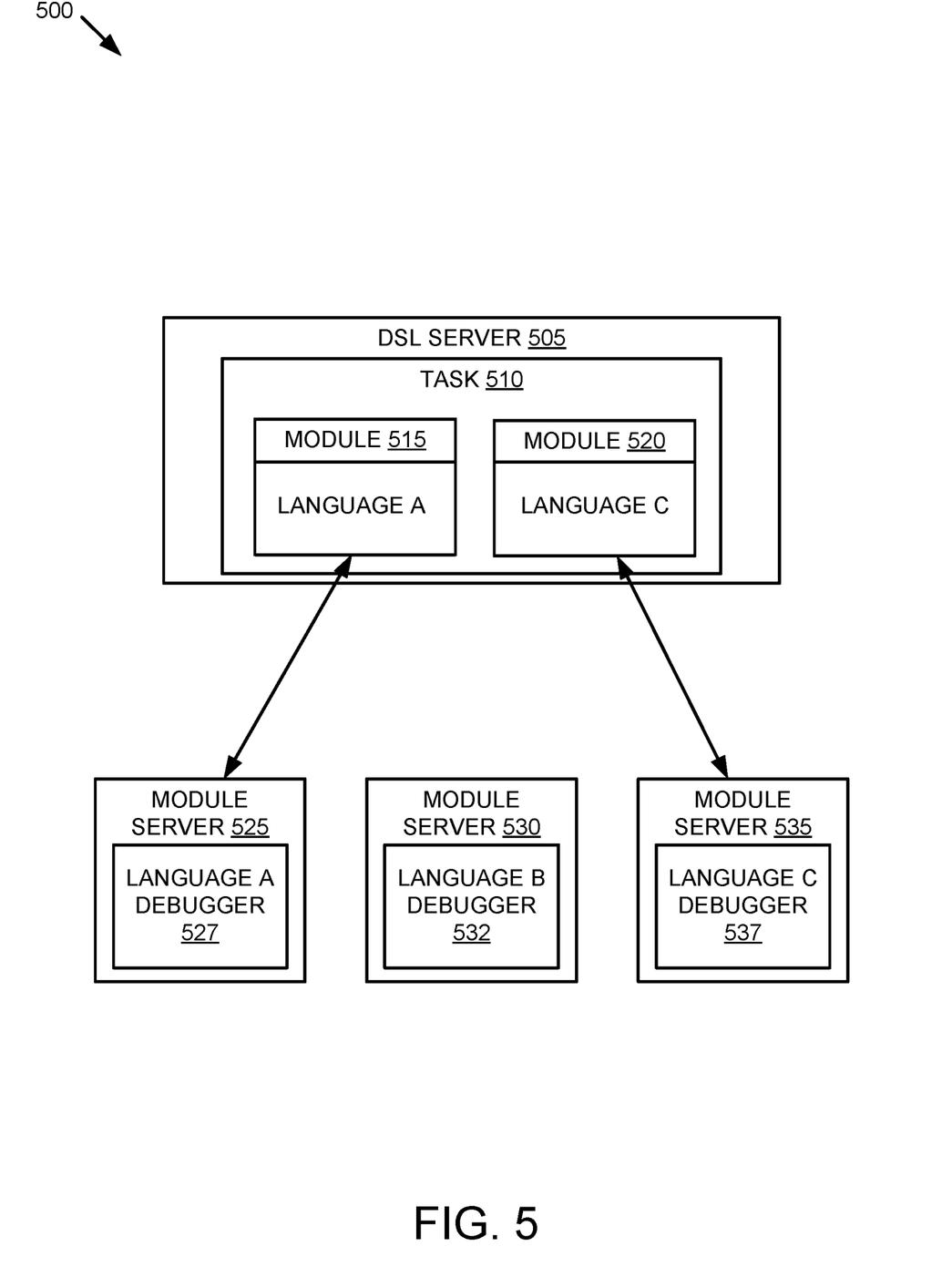
FIG. 5 is an illustration of an example of a multi-level debugging system identifying module debuggers in view of programming languages of the modules in accordance with some embodiments of the disclosure.

FIG. 5 is an illustration of an example of a multi-level debugging system 500 identifying module debuggers in view of programming languages of the modules in accordance with some embodiments of the disclosure. A processing device (not shown) of a DSL server 505 of the multi-level debugging system 500 may execute a task 510 using a DSL debugger. The task 510 utilizes modules 515 and 520. Module 515 utilizes programming language A and module 520 utilizes programming language C. It should be noted that task 510 and modules 515 and 520 are shown for illustrative purposes and are not physical components of DSL server 505.

DSL server 505 is operatively coupled to module servers 525, 530, 535 via a network (not shown). Each of module servers 525, 530 and 535 may include a library of modules that use a particular programming language. Each of module servers 525, 530 and 535 may further include a module debugger for the particular programming language of that particular server. Referring to FIG. 5, module server 525 includes a module debugger for programming language A (e.g., language A debugger 527), module server 530 includes a module debugger for programming language B (e.g., language B debugger 532) and module server 535 includes a module debugger for programming language C (e.g., language C debugger 537).

As previously described, the processing device of DSL server 505 may identify one or more module debuggers associated with modules of the task in view of the programming languages of the modules. Since module 515 utilizes programming language A and module 520 utilizes programming language C, the processing device may identify language A debugger 527 of module server 525 and language C debugger 537 of module server 535.

Upon identifying the module debuggers, the processing device may transmit task debugging data to module server 525 for debugging of module 515 by language A debugger 527. In embodiments, task debugging data may include input values for module 515, a location of module 515, input values for module 515 and the programming language (e.g., language A) of module 515. The processing device may also transmit task debugging data to module server 535 for debugging of module 520 by language C debugger 537. In embodiments, task debugging data may include input values for module 520, a location of module 520 and the programming language (e.g., language C) of module 520. After executing module 515 using the language A debugger 527 and the task debugging data, module server 525 may transmit module debugging data for module 515 to DSL server 505. After executing module 520 using the language C debugger 537 and the task debugging data, module server 535 may transmit module debugging data for module 520 to DSL server 505.

Figure 6:
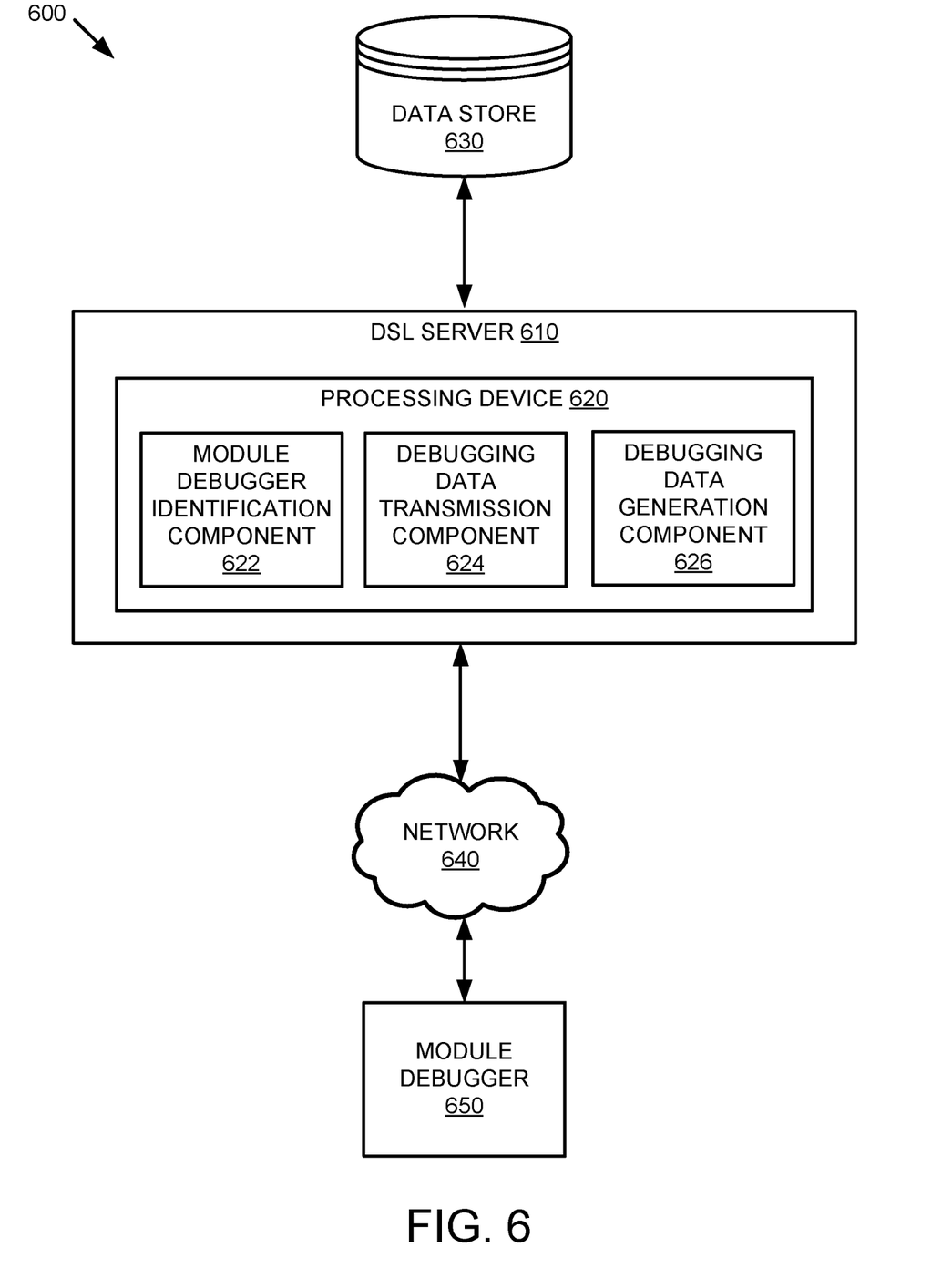
FIG. 6 is a block diagram that illustrates an example of a DSL server in accordance with some aspects of the present disclosure.

FIG. 6 is a block diagram 600 that illustrates an example of a DSL server in accordance with some aspects of the present disclosure. A processing device 620 of the DSL server 610 is coupled to a data store 630. The processing device 620 may include a module debugger identification component 622, a debugging data transmission component 624, and a debugging data generation component 626. The DSL server 610 may be operatively coupled to a module debugger 650 executed by a module server (not shown) via a network 650.

The module debugger identification component 622 may determine a programming language of a module utilized by a task. The module debugger identification component 622 may identify a module debugger for the module in view of the determined programming language. The debugging data transmission component 624 may transmit task debugging data to the module debugger identified by the module debugger identification component 622. The debugging data transmission component 624 may receive module debugging data from the module debugger. The debugging data generation component 626 may generate multi-level debugging data in view of the task debugging data and the module debugging data.

Figure 7:
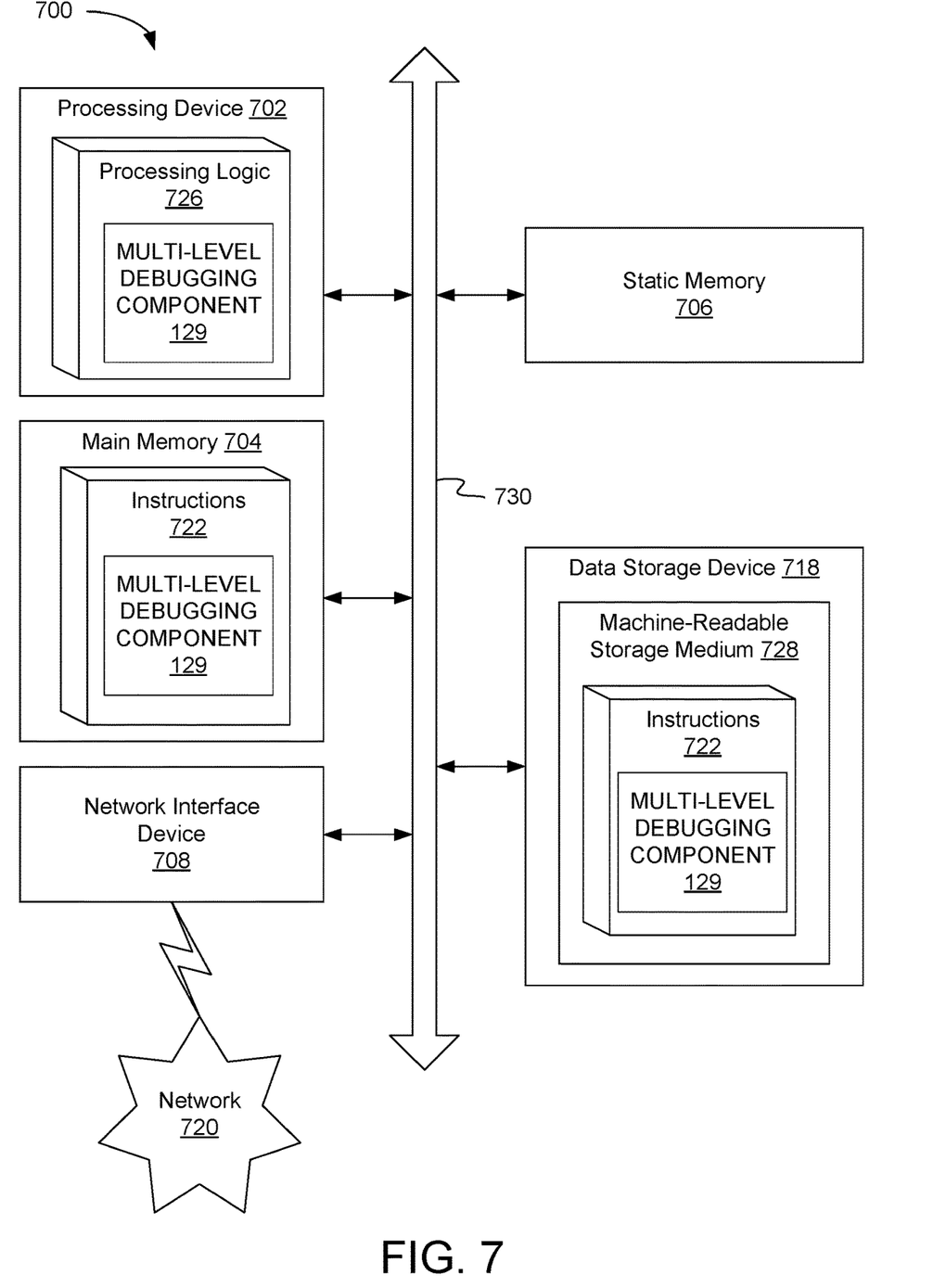
FIG. 7 is a block diagram of an example apparatus that may perform one or more of the operations described herein, in accordance with some embodiments.

FIG. 7 illustrates a diagrammatic representation of a machine in the example form of a computer system 700 within which a set of instructions, for causing the machine to perform any one or more of the methodologies discussed herein, may be executed. In alternative embodiments, the machine may be connected (e.g., networked) to other machines in a local area network (LAN), an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, a switch or bridge, a hub, an access point, a network access control device, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein. In one embodiment, computer system 700 may be representative of a server, such as DSL server 110 configured to perform multi-level task debugging.

The exemplary computer system 700 includes a processing device 702, a main memory 704 (e.g., read-only memory (ROM), flash memory, dynamic random access memory (DRAM), a static memory 706 (e.g., flash memory, static random access memory (SRAM), etc.), and a data storage device 718, which communicate with each other via a bus 730. Any of the signals provided over various buses described herein may be time multiplexed with other signals and provided over one or more common buses. Additionally, the interconnection between circuit components or blocks may be shown as buses or as single signal lines. Each of the buses may alternatively be one or more single signal lines and each of the single signal lines may alternatively be buses.

Processing device 702 represents one or more general-purpose processing devices such as a microprocessor, central processing unit, or the like. More particularly, the processing device may be complex instruction set computing (CISC) microprocessor, reduced instruction set computer (RISC) microprocessor, very long instruction word (VLIW) microprocessor, or processor implementing other instruction sets, or processors implementing a combination of instruction sets. Processing device 702 may also be one or more special-purpose processing devices such as an application specific integrated circuit (ASIC), a field programmable gate array (FPGA), a digital signal processor (DSP), network processor, or the like. The processing device 702 is configured to execute processing logic 726, which may be one example of multi-level debugging component 129 of FIG. 1, for performing the operations and steps discussed herein.

The data storage device 718 may include a machine-readable storage medium 728, on which is stored one or more set of instructions 722 (e.g., software) embodying any one or more of the methodologies of functions described herein, including instructions to cause the processing device 702 to execute multi-level debugging component 129. The instructions 722 may also reside, completely or at least partially, within the main memory 704 or within the processing device 702 during execution thereof by the computer system 700; the main memory 704 and the processing device 702 also constituting machine-readable storage media. The instructions 722 may further be transmitted or received over a network 720 via the network interface device 708.

The machine-readable storage medium 728 may also be used to store instructions to perform a method for multi-level task debugging, as described herein. While the machine-readable storage medium 728 is shown in an exemplary embodiment to be a single medium, the term "machine-readable storage medium" should be taken to include a single medium or multiple media (e.g., a centralized or distributed database, or associated caches and servers) that store the one or more sets of instructions. A machine-readable medium includes any mechanism for storing information in a form (e.g., software, processing application) readable by a machine (e.g., a computer). The machine-readable medium may include, but is not limited to, magnetic storage medium (e.g., floppy diskette); optical storage medium (e.g., CD-ROM); magneto-optical storage medium; read-only memory (ROM); random-access memory (RAM); erasable programmable memory (e.g., EPROM and EEPROM); flash memory; or another type of medium suitable for storing electronic instructions.

The preceding description sets forth numerous specific details such as examples of specific systems, components, methods, and so forth, in order to provide a good understanding of several embodiments of the present disclosure. It will be apparent to one skilled in the art, however, that at least some embodiments of the present disclosure may be practiced without these specific details. In other instances, well-known components or methods are not described in detail or are presented in simple block diagram format in order to avoid unnecessarily obscuring the present disclosure. Thus, the specific details set forth are merely exemplary. Particular embodiments may vary from these exemplary details and still be contemplated to be within the scope of the present disclosure.

Additionally, some embodiments may be practiced in distributed computing environments where the machine-readable medium is stored on and or executed by more than one computer system. In addition, the information transferred between computer systems may either be pulled or pushed across the communication medium connecting the computer systems.

Embodiments of the claimed subject matter include, but are not limited to, various operations described herein. These operations may be performed by hardware components, software, firmware, or a combination thereof.

Although the operations of the methods herein are shown and described in a particular order, the order of the operations of each method may be altered so that certain operations may be performed in an inverse order or so that certain operation may be performed, at least in part, concurrently with other operations. In another embodiment, instructions or sub-operations of distinct operations may be in an intermittent or alternating manner.

The above description of illustrated implementations of the invention, including what is described in the Abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

It will be appreciated that variants of the above-disclosed and other features and functions, or alternatives thereof, may be combined into may other different systems or applications. Various presently unforeseen or unanticipated alternatives, modifications, variations, or improvements therein may be subsequently made by those skilled in the art which are also intended to be encompassed by the following claims. The claims may encompass embodiments in hardware, software, or a combination thereof

What is claimed is:

1. A method, comprising:
executing a task in a domain specific language (DSL) at a DSL server hosting a configuration management system, the task comprising calls to a plurality of modules written in different programming languages, wherein the plurality of modules are hosted by one or more module servers;
determining whether a triggering event has occurred during execution of the task, the triggering event corresponding to an output value for a first module of the task satisfying a threshold;
in response to determining that the triggering event has occurred, inserting a breakpoint into a location of a script of the task, the location of the script corresponding to the first module of the plurality of modules of the task for which the output value satisfied the threshold;
executing the task using a DSL debugger, wherein the DSL debugger generates task debugging data for the task in the DSL;
identifying the breakpoint in the task corresponding to a call to the first module of the plurality of modules of the task;

in response to identifying the breakpoint, identifying, by a processing device, a module debugger on a first module server of the one or more module servers associated with the first module of the plurality of modules of the task, based on a programming language of the first module;

transmitting, to the module server of the one or more module servers corresponding to the identified module debugger, the task debugging data generated by executing the task using the DSL debugger, wherein the task debugging data comprises input values for the first module to be used by the module debugger to execute the first module, a location of the first module, and the programming language of the first module;

receiving, from the module server hosting the identified module debugger, module debugging data and one or more output values of the module to be used for continued execution of the task, wherein the module debugging data is determined in view of the task debugging data associated with the execution of the task; and generating multi-level debugging data comprising the task debugging data and the received module debugging data.

2. The method of claim 1, wherein identifying the module debugger associated with the first module of the plurality of modules of the task comprises:

determining a programming language associated with the first module of the plurality of modules of the task; and identifying the module debugger associated with the first module in view of the determined programming language.

3. The method of claim 1, wherein the triggering event further comprises at least one of:

an error during a prior execution of the task, or receiving a request to debug the task.

4. The method of claim 1, further comprising:

determining whether the task comprises a module breakpoint, wherein identifying the module debugger associated with the first module of the task is in response to determining that the task comprises the module breakpoint.

5. The method of claim 1, wherein the task comprises a node of an abstract syntax tree.

6. The method of claim 1, further comprising:

determining a second programming language associated with a second module of the plurality of modules of the task;

identifying a second module debugger associated with the second module in view of the determined second programming language;

transmitting, to the identified second module debugger, second task debugging data associated with the execution of the task, wherein the second task debugging data comprises input values for the second module, a location of the second module, and a programming language of the second module; and receiving, from the identified second module debugger, second module debugging data, wherein the second module debugging data is determined in view of the second task debugging data associated with the execution of the task and wherein the multi-level debugging data further comprises the second task debugging data and the received second module debugging data.

7. A system, comprising:

a memory; and a processing device, operatively coupled to the memory, to:

execute a task using a domain-specific language (DSL) at a DSL server hosting a configuration management system, the task comprising calls to a plurality of modules written in different programming languages, wherein the plurality of modules are hosted by one or more module servers;

determine whether a triggering event has occurred during execution of the task, the triggering event corresponding to an output value for a first module of the plurality of modules of the task satisfying a threshold;

insert a breakpoint into a location of a script of the task, the location of the script corresponding to the module of the task for which the output value satisfied the threshold;

in response to determining that the triggering event has occurred during execution of the task, execute the task using a DSL debugger to generate task debugging data for the task in the DSL;

identify the breakpoint in the task corresponding to a call to the first module of the plurality of modules of the task;

in response to identifying the breakpoint, transmit the generated task debugging data to a first module server of one or more module servers hosting a module debugger associated with the first module of the plurality of modules, wherein the task debugging data comprises input values for the first module to be used by the module debugger to execute the module, a location of the first module, and a programming language of the first module;

receive, from the module server hosting the module debugger, module debugging data and one or more output values of the first module to be used for continued execution of the task; and generate multi-level debugging data comprising the generated task debugging data and the received module debugging data.

8. The system of claim 7, wherein to transmit the generated task debugging data to the module debugger associated with the first module of the plurality of modules, the processing device is further to:

determine a programming language associated with the first module of the plurality of modules;

identify the module debugger in view of the determined programming language of the first module of the plurality of modules; and transmit the generated task debugging data to the identified module debugger.

9. The system of claim 7, the triggering event comprises at least one of: an error during the execution of the task using the DSL, receiving a request to debug the task, or a parameter associated with the task satisfying a threshold during the execution of the task using the DSL.

10. The system of claim 7, wherein the processing device is further to:

upon determining that the triggering event has occurred during the execution of the task, insert a module breakpoint in the task in view of the occurrence of the triggering event.

11. The system of claim 7, wherein the task comprises a node of an abstract syntax tree.

12. The system of claim 7, wherein the processing device is further to:

transmit second task debugging data to a second module debugger associated with a second module of the plurality of modules; and receive, from the second module debugger, second module debugging data in view of the second task debugging data, wherein the generated multi-level debugging data further comprises the received second module debugging data.

13. A non-transitory computer-readable storage medium including instructions that, when executed by a processing device, cause the processing device to:

execute a task in a domain specific language (DSL) at a DSL server hosting a configuration management system, the task comprising calls to a plurality of modules written in different programming languages, wherein the plurality of modules are hosted by one or more module servers;

determine whether a triggering event has occurred during execution of the task, the triggering event corresponding to an output value for a first module of the task satisfying a threshold;

in response to determining that the triggering event has occurred, insert a breakpoint into a location of a script of the task, the location of the script corresponding to the first module of the task for which the output value satisfied the threshold;

execute the task using a DSL debugger, wherein the DSL debugger generates task debugging data for the task in the DSL;

identify the breakpoint in the task corresponding to a call to the first module of the plurality of modules of the task;

in response to identifying the breakpoint, identify, by the processing device, a module debugger on a first module server of the one or more module servers associated with the first module of the plurality of modules of the task, based on a programming language of the first module;

transmit, to the identified module debugger, task debugging data generated by executing the task using the DSL debugger, wherein the task debugging data comprises input values for the first module of the plurality of modules of the task to be used by the module debugger to execute the first module, a location of the first module, and the programming language of the first module;

receive, from the module server hosting the identified module debugger, module debugging data and one or more output values of the first module to be used for continued execution of the task, wherein the module debugging data is determined in view of the task debugging data associated with the execution of the task; and generate multi-level debugging data comprising the task debugging data and the received module debugging data.

14. The non-transitory computer-readable storage medium of claim 13, wherein to identify the module debugger associated with the first module of the plurality of modules of the task, the processing device is further to:

determine a programming language associated with the first module of the plurality of modules of the task; and identify the module debugger associated with the first module in view of the determined programming language.

15. The non-transitory computer-readable storage medium of claim 13, wherein the triggering event comprises at least one of:

an error during a prior execution of the task, or receiving a request to debug the task.

16. The non-transitory computer-readable storage medium of claim 13, wherein the processing device is further to:

determine whether the task comprises a module breakpoint, wherein the processing device is to identify the module debugger associated with the first module of the task in response to determining that the task comprises the module breakpoint.

17. The non-transitory computer-readable storage medium of claim 13, wherein the processing device is further to:

determine a second programming language associated with a second module of the plurality of modules of the task;

identify a second module debugger associated with the second module in view of the determined second programming language;

transmit, to the identified second module debugger, second task debugging data associated with the execution of the task; and receive, from the identified second module debugger, second module debugging data, wherein the second module debugging data is determined in view of the second task debugging data associated with the execution of the task and wherein generating the multi-level debugging data further comprises the second task debugging data and the received second module debugging data.

* * * * *